United States Patent [19]

Bazzurro

[11] Patent Number: 4,624,024

[45] Date of Patent: Nov. 25, 1986

[54] METHOD FOR THE MANUFACTURE OF A SELF-LOCKING NUT

[75] Inventor: Andrea Bazzurro, Monza, Italy

[73] Assignee: Bulloneria Barge S.p.A., Italy

[21] Appl. No.: 665,851

[22] Filed: Oct. 29, 1984

[30] Foreign Application Priority Data

Oct. 28, 1983 [IT] Italy .................. 68130 A/83

[51] Int. Cl.⁴ .................. B21D 53/24; B21K 1/70
[52] U.S. Cl. .................. 10/86 A
[58] Field of Search ............ 10/86 A, 86 F; 411/276, 411/286, 287, 288, 285, 290

[56] References Cited

U.S. PATENT DOCUMENTS

| | | | |
|---|---|---|---|
| 1,077,023 | 10/1913 | Ward | 411/285 |
| 1,963,845 | 6/1934 | Hosking | 411/285 X |
| 2,320,785 | 6/1943 | Luce | 411/285 |
| 2,352,668 | 7/1944 | Tripp | 10/86 A |
| 2,539,899 | 1/1951 | Delaney | 10/86 A |

FOREIGN PATENT DOCUMENTS 512008  8/1939  United Kingdom ........... 411/287

Primary Examiner—E. Michael Combs
Attorney, Agent, or Firm—Sughrue, Mion, Zinn, Macpeak, and Seas

[57] ABSTRACT

In a self-locking nut comprising a nut body having first and second end surfaces and a threaded hole opening onto these surfaces, at least a first turn of the thread of the hole immediately adjacent the first end surface of the nut is squashed axially towards the second end surface. The first turn is formed by a series of equiangularly-spaced projections located on the first end surface of the nut adjacent the hole. The method for the manufacture of the self-locking nut includes a main pressing operation for making a nut body with first and second end surfaces and a hole opening onto these surfaces, and an operation for threading the hole. The method also includes a secondary pressing operation after the threading operation, for squashing at least a first turn of the nut thread immediately adjacent the first end surface axially towards the second end surface. The nut body made by the main pressing operation has a series of equiangularly-spaced projections located on the first end surface adjacent the hole, in which the first turn of the thread is formed.

2 Claims, 6 Drawing Figures

METHOD FOR THE MANUFACTURE OF A SELF-LOCKING NUT

The present invention relates to a nut comprising a nut body having first and second end surfaces and a threaded hole opening onto these surfaces.

The object of the invention is to provide a nut of the type specified above which behaves as a self-locking nut, that is, which has effective and reliable means for resisting spontaneous slackening due to vibrations, and which at the same time has a relatively simple and cheap structure.

In order to achieve this object, the invention provides a nut of the type specified above, characterised in that at least a first turn of the thread of the hole immediately adjacent the first end surface of the nut is squashed axially towards the second end surface of the nut, and in that this first turn is formed in a series of equiangularly-spaced projections on the first end surface adjacent the hole.

The invention also provides a method for the manufacture of a nut, comprising a main pressing operation for making a nut body with first and second end surfaces and a hole opening onto these surfaces, and an operation for threading the hole, characterised in that the method includes a secondary pressing operation after the threading operation, for squashing at least a first turn of the thread of the hole immediately adjacent the first end surface axially towards the second end surface, and in that the nut body made by the main pressing operation has a series of equiangularly-spaced projections on its first end surface adjacent the hole, in which the first turn of the thread of the hole is formed.

In a preferred embodiment, the first end surface of the nut body made by the main pressing operation includes a central recessed part with a flat outer annular portion and a conical inner annular portion adjacent the hole, and each of the projections is located in the recessed central part and, before the threading operation, has a surface facing the central axis of the nut and lying on an extension of the surface of the hole.

The present invention will now be described with reference to the appended drawings, provided purely by way of non-limiting example, in which.

Figure 1:
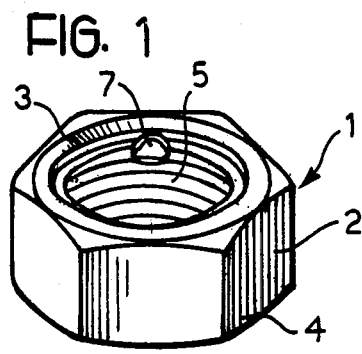
FIG. 1 is a perspective view of a nut according to the invention.

With reference to FIG. 1, a self-locking nut, generally indicated 1, comprises a nut body 2 with a first end surface 3 and a second end surface 4, and a threaded hole 5 the ends of which open onto the surfaces 3, 4.

Figure 2:
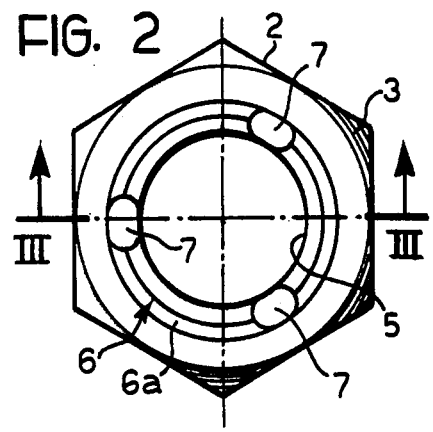
FIG. 2 is a plan view of the nut body formed in an intermediate step of the method of manufacture of the nut of FIG. 1.
Figure 3:
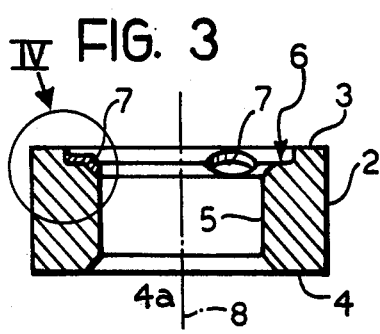
FIG. 3 is a sectional view taken on the line III—III of FIG. 2.

The method for the manufacture of the nut 1 includes a first, main pressing operation for forming the nut body 2 (see FIGS. 2 and 3). After this main pressing operation, the hole 5 of the nut has a smooth cylindrical surface. Furthermore, the end surface 3 has a central recessed part 6 (see FIG. 3) including a flat outer annular portion 6a (see FIG. 4) and a conical inner annular portion 6b adjacent the hole 5. The end surface 4 of the nut body 2 also has a conical annular portion 4a adjacent the hole 5.

Figure 4:
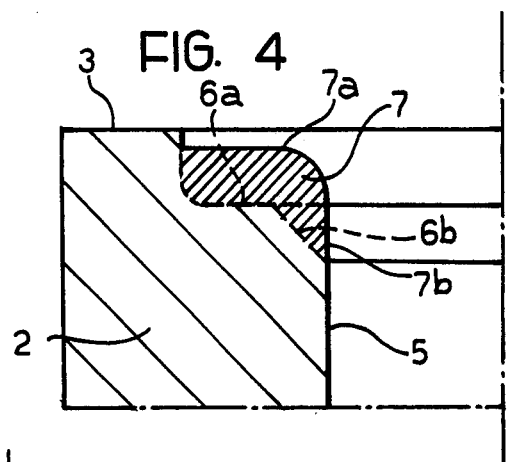
FIG. 4 illustrates the detail indicated by the arrow IV in FIG. 3, on an enlarged scale.

As shown in FIGS. 2 to 4, the rough nut body 2 made by the main pressing operation has a series of projections 7 located in the central recessed part 6 of the end surface 3 in equiangularly-spaced positions. In the embodiment illustrated, three projections 7 are formed in the central recessed part 6 of the end surface 3. Each projection 7 made in the rough nut body 2 has an upper surface 7a parallel to and adjacent the flat outer part of the end surface 3, and a surface 7b facing the central axis 8 of the body 2 and lying on an extension of the cylindrical surface of the hole 5.

Figure 5:
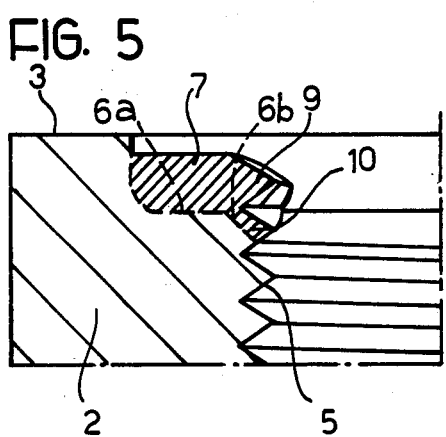
FIGS. 5 and 6 illustrate the detail of FIG. 4 in two successive steps of the method of manufacture of the nut of FIG. 1.

Once the rough nut body 2 has been formed, the wall of the hole 5 is subjected to a threading operation so as to make a piece of the type illustrated in FIG. 5. As shown in this drawing, the threading operation removes material not only from the wall of the hole 5 but also from the projections 7. Consequently, the first turn (indicated 9 in FIG. 5) of the thread of the hole 5 of the nut is formed in the three projections 7. In the case of the projection 7 visible in FIG. 5, the second turn of the thread (indicated 10) immediately adjacent the first turn 9 is also formed in the projection 7.

The nut thus obtained is subjected to a secondary pressing operation by means of which the three projections 7 are squashed axially towards the second end surface 4 of the nut.

Figure 6:
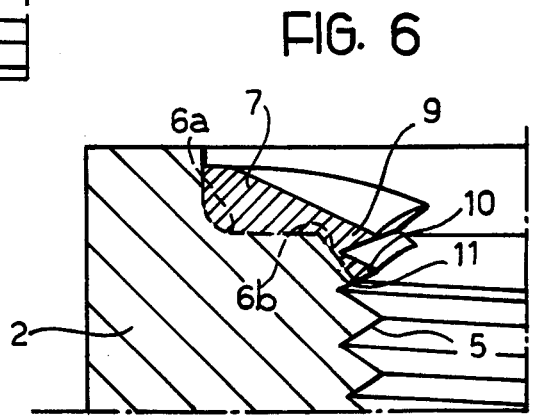

As seen in FIG. 6, the first turn 9 of the thread, formed in the three projections 7, is thus deformed towards the end surface 4 of the nut body from the position illustrated in FIG. 5.

Preferably, the squashing of the projections 7 is carried out in such a way as to deform also at least the first turn 11 of the thread immediately beneath the projections 7.

In use, a screw having a thread corresponding to that of the hole 5 is screwed into the hole, being inserted from the end surface 4. When the end of the screw reaches the turn 11 of the thread of the hole 5 and subsequently the turn portions 10, 9 formed in the three projections 7, the turn 11 and the turn portion 10, 9 deform in the opposite direction to that of the initial deformation produced by the secondary pressing operations, that is, towards the first end surface 3 of the nut. This gives rise to an elastic reaction which ensures security against any possible slackening of the connection. When the turn 11 of the thread hole 5 is engaged by the screw, this turn acts like a fixed beam subject to bending in the zones of the aforesaid axial squashing produced by the secondary pressing operation. In these zones, the turn 11 is reinforced by the material of the projections 7, increasing the reliability of the nut.

The elastic reaction of the deformed turn of the thread of the nut tends to oppose the movement of the thread of the screw as the latter is inserted in the nut, creating a zone of contact with considerable friction between the turn of the thread of the screw and the reinforced deformed turn of the thread of the nut.

Even after further unscrewings and screwings, the elastic force of the reinforced deformed turn continues to ensure the friction necessary to prevent unscrewing.

The secondary pressing operation for effecting the axial deformation of the three projections 7 may be carried out, for example, by a punch which is pressed axially onto the nut and is shaped so as to act only on the three projections 7. After the operation of axially deforming the three projections, the nut may be subjected to heat treatment and possibly to a surface treatment.

Naturally, although three projections are used in the example described above, it is clear that these projections could be of any number and extent. More particularly, the axial extent and radical extent of each projection 7 could perhaps be different from that illustrated. The circumferential extent of each projection 7 may also differ and be determined in dependence on the type of nut, the pitch of the thread, and the desired magnitude of the torques opposing screwing and unscrewing.

It should be noted that the method described above does not cause any change in the circular profile (in a plane substantially perpendicular to the axis of the nut) of the deformed turn of the thread of the nut.

The main (hot or cold) pressing operation for producing the rough body of the nut 2 illustrated in FIG. 3 may be carried out on a conventional machine, with only a modification to the frontal form of the punch or punches for obtaining the projections 7. The subsequent operation of threading the hole 5 may also be carried out on any type of conventional machine.

As already mentioned above, the secondary pressing operation is carried out by means of a punch having a form such as to ensure only the squashing of the zones in which the projections 7 are located. A press of any conventional type may also be used for this operation.

Naturally, the principle of the invention remaining the same, the constructional details and forms of embodiment may be varied widely with respect to that described and illustrated purely by way of example, without thereby departing from the scope of the present invention.

I claim:

1. A method for manufacture of a self-locking nut comprising:

performing a first pressing operation to form a nut body with first and second end surfaces, a hole having a smooth surface extending axially of said nut body and a central recessed portion in said first surface surrounding said hole and having a plurality of equally spaced, axially extending projections located within said recessed portion with a surface of each projection facing the central axis of the nut body defining a contiguous extension of the surface of said hole;

forming a thread within said hole with the first turn of said thread being formed in said surface of each projection facing the central axis of the nut body; and performing a second pressing operation subsequent to said thread forming for squashing at least said first turn of the thread of said hole immediately adjacent said first end surface axially toward said second end surface.

2. A method as set forth in claim 1 comprising exerting sufficient pressure in said second pressing operation to axially squash the turn of said thread immediately beneath said projections towards the second end surface in correspondence with the zones in which said projections are located.

* * * * *